Sept. 8, 1970        T. H. FAIRBANKS        3,527,859

MANUFACTURE OF SCORED FILMS

Filed Dec. 11, 1967

United States Patent Office 3,527,859
Patented Sept. 8, 1970

3,527,859
MANUFACTURE OF SCORED FILMS
Theodore H. Fairbanks, West Chester, Pa., assignor to FMC Corporation, Philadelphia, Pa., a corporation of Delaware
Filed Dec. 11, 1967, Ser. No. 689,478
Int. Cl. B29d 7/04, 7/24; B29f 3/04
U.S. Cl. 264—177         2 Claims

ABSTRACT OF THE DISCLOSURE

Manufacture of films having longitudinally extending grooved or scored areas. A streamlined flow of film forming material is subdivided into separate substreams by obstructing members placed inside the die and before the die discharge orifice. With such a nozzle construction, the substreams contact and partially blend into a continuous, unbroken film possessing areas extending longitudinally thereof which are of reduced thickness, and the said film is thereafter released from the die and set to provide a solid film.

---

The present invention relates to an improved method for making longitudinally pre-patterned films by extrusion.

The extrusion of individual narrow tapes or ribbons, such as for use as strapping in the packaging field, is generally uneconomical. Thus, a common practice is to extrude a relatively wide sheet or film of desired thickness and subsequently slit the same into tapes or ribbons of appropriate widths. Film slitting operations, however, are difficult, expensive and usually require high-precision equipment which need frequent and costly maintenance. Accordingly, a primary object of this invention is to provide a generally new or improved and more satisfactory extrusion method for making tapes or ribbons.

Another object of this invention is to provide an extrusion method for making films having a textured surface which improves its winding and handling characteristics, facilitates a more tenacious bond of coatings applied thereto, minimizes slipping in a transverse direction between overlying layers and is appealing in appearance.

Still another object of this invention is to provide a method for making longitudinally pre-patterned films which can be readily separated into tapes or ribbons without conventional slitting procedures.

A further object of this invention is the provision of a method for making a longitudinally pre-patterned film by extrusion in which the flow properties of the film-forming material which is being extruded are themselves utilized in assisting the shape thereof.

These and other objects are accomplished in accordance with the present invention by a method in which a continuous unbroken stream of flowable film-forming material, which is unconfined in only its direction of flow, is first obstructed in a direction generally perpendicular to its direction of flow at areas spaced transversely of the direction of stream flow. In this manner, the stream of flowable film-forming material is divided into a series of separate streamlined flows. Successive portions of adjacent of these streamlined flows of film-forming material are permitted to contact or merge and partially blend with each other along their longitudinal edges concomitantly with their continuous travel to thereby provide an unbroken stream of film-forming material having continuous, substantially parallel areas extending longitudinally thereof which are of reduced thickness. With the areas of reduced thickness being present, this stream is then released from confinement and set as a solid film. Preferably, the initial stream of film-forming material is under a generally constant or uniform pressure.

Of particular importance in the method of the present invention is that only partial blending occurs between adjacent streamline flows of film-forming material at their lines of contact before they are released from confinement and set. More specifically, some blending of these streamline flows of film-forming material is desired so that they together are released from confinement as an unbroken stream rather than as individual flows. However, complete blending of these streamline flows of film-forming material before their release from confinement and setting is avoided.

This incomplete blending between the adjacent flows of film-forming material along their lines of contact is evidenced in the resulting film as a longitudinally extending pattern of grooves or score lines. Obviously, the less blending which occurs between such streamline flows of film-forming material the more pronounced are the grooves or score lines in the resulting film. In such instances, the grooves or score lines define weakened areas along which the film may be readily separated into individual tapes or ribbons.

Alternatively, the more blending which is permitted between such streamline flows of film-forming material before they are released from confinement and set, the less apparent are the grooves or score lines in the resulting film. Thus, with the exercise of control over the degree of blending of such streamline flows of film-forming material, the grooves or score lines in the resulting film may be such as to improve its slip characteristics during winding and handling, increase in resistance to slipping in a transverse direction or may be almost imperceptible to the naked eye, for example, to enhance the bonding of coatings thereto.

Preferably, the film which is produced by the method of the present invention is stretched along its longitudinal axis to effect orientation of the molecules thereof. Such orientation will, of course, improve the tensile properties of the film and, if applicable, enhance its ability to be separated into tapes or ribbons.

As noted above, the surface pattern exhibited by the resulting film is dependent upon the degree of blending which occurs between the streamlined flows of film-forming material before they are released from confinement and set. This blending of the flows of film-forming material, in turn, depends upon such factors as the pressure which is applied to the initial stream of film-forming material, its viscosity, and the manner in which such stream is divided into separate streamline flows.

Once divided into streamlined flows of film-forming material, the flows themselves have an inherent tendency to merge or blend together into a single stream. The greater the pressure which is applied to the initial stream of film-forming material, the higher the velocity of the streamline flows of film-forming material and the longer the distance such flows travel before they contact each other and blend to a desired degree. Similarly, film-forming materials of higher viscosity have less tendency to spread laterally and thus such streamlined flows of film-forming material must necessarily travel a longer distance before they move into contact with each other.

The manner by which the initial stream of film-forming material is divided into separate streamlined flows determines both the spacing of such flow as well as their velocity and depends upon the particular apparatus employed, as hereafter described.

The apparatus employed in the method of the present invention includes a nozzle having a passage into which a stream of film-forming material is delivered under pressure, a continuous, unobstructed discharge orifice, and a series of spaced members extending across the nozzle passage at substantially right angles to the direction of flow of film-forming material therethrough for obstructing and dividing such stream into a series of separate streamlined flows. This series of stream obstructing members is spaced from the nozzle discharge orifice a distance sufficient to permit the adjacent of the separate streamlined flows of film-forming material to contact and blend with each other to a desired degree while they are still within the nozzle itself; that is, before leaving the discharge orifice. With such nozzle construction, the contracting and partially blended streamlined flows of film-forming material provide an unbroken stream which is set outwardly of the nozzle discharge orifice by suitable means.

The nozzle may be either of flat or annular construction and the stream of film-forming material extruded therefrom may be of either uniform or varying thickness across its transverse dimension.

Each of the spaced members employed in obstructing the initial stream of film-forming material are of smooth, streamlined contour and, preferably, are in the form of fine wires which extend across a nozzle passage. Such wires are stretched when fixed in position so as to remain taut under the pressure applied to the initial stream of film-forming material. Of course, the stream of film-forming material may be divided into separate flows by means other than wires, as for example by plates or deflectors having a blade-like or tear-drop cross-section. Regardless of the particular stream obstructing members employed, all of the members of a series should be of like size and shape.

The spacing between the stream obstructing or dividing members can be varied to provide a desired spacing of grooves or score lines in the finished film. Preferably, but not necessarily, all of these members may be in a vertical plane which extends across the nozzle passage and is generally parallel to a similar plane extending across the discharge orifice.

All of the stream obstructing members, however, must be spaced from the nozzle discharge orifice a distance sufficient to permit adjacent streamlined flows of film-forming material to contact and blend to a desired degree before issuing from the nozzle orifice. As heretofore mentioned, the location of these members relative to the nozzle discharge orifice will depend upon such factors as the pressure and viscosity of the initial stream of film-forming material. Important also in this respect are the sizes and shapes of the members themselves. Obviously, the thicker are the stream obstructing members, the greater is the spacing between adjacent flows of film-forming material which are formed and the longer the distance such flows must travel before they contact and blend with each other. The locations at which such streamline flows of film-forming material contact will also depend upon the flow characteristics imparted thereto by the stream obstructing members themselves. For example, members of tear-drop or thin blade-like construction may cause the flows of film-forming material to sweep toward each other almost immediately after such flows move past the members, while a delayed contact and blending of such flows of film-forming material may be provided by using wires.

The teachings of the present invention are applicable for use with a variety of materials which are referred to, by the term "plastic," including materials whih are thermoplastic, such as, polyamides or superpolyamides, polyesters, polyvinyl chloride, copolymers thereof, polyolefins, cellulose acetates, metals, glasses, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired. It will be apparent that the particular material employed will determine the manner by which such material is set after its extrusion.

For a greater understanding of this invention, reference is made to the following detailed description and drawing in which FIG. 1 is a plan view of the apparatus employed in the method of the present invention with a portion thereof being removed;

Figure 1:
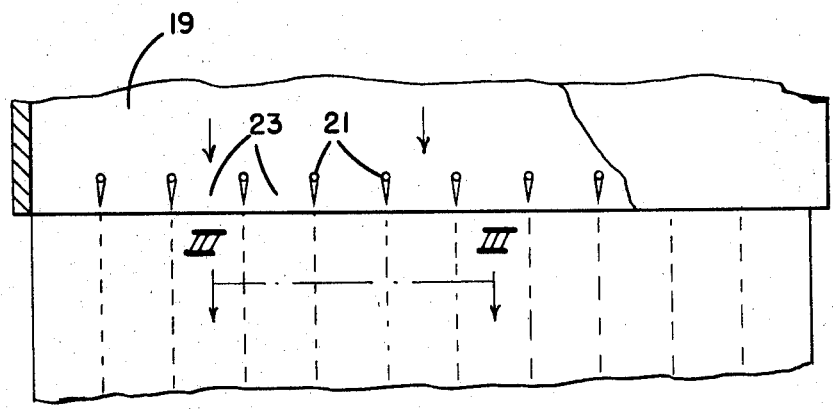

With reference to the drawing, the flat nozzle there illustrated includes spaced die lips or blades 9 and 11 which extend between end walls 13 and 15 and together define a passage 17 for a flowable film-forming material 19. Inwardly of the nozzle and extending across its passageway 17 is a series of equally spaced fine round wires 21. As illustrated, the wires 21 all lie in the same plane, which is generally parallel to a similar plane extending across the discharge orifice, and are each stretched when fixed to the nozzle blades 9 and 11 so as to remain taut under the pressure which is applied to the film-forming material 19.

In the practice of the method of the present invention with the described nozzle construction, a stream of film-forming material 19 is delivered into the nozzle passage 17 under a constant or uniform pressure and moves past the wires 21 where it is divided into separate streamlined flows 23. The distance between the wires 21 and the nozzle discharge orifice is such that the streamlined flows of film-forming material 21 contact and only partially blend with each other within the nozzle itself to provide an unbroken stream of film-forming material. This unbroken stream of film-forming material is then extruded from the nozzle discharge orifice and is set, as for example, by cool air in the case of a molten film-forming material, to provide a film as shown at 25.

Figure 3:
FIG. 3 is a vertical section taken along the line III—III of FIG. 1 of a film as formed by the apparatus there illustrated.
Figure 2:
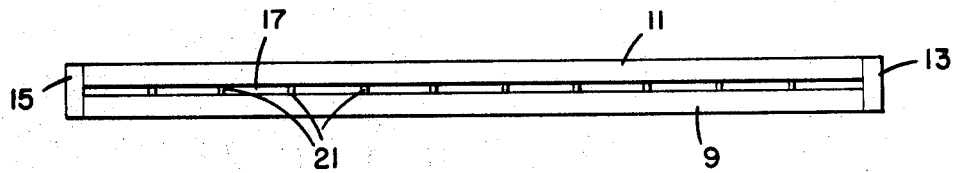
FIG. 2 is an end view of the apparatus shown in FIG. 1.

In the finished film 25, spaced areas 27 of reduced thickness are indicative of the degree of blending which did occur between the streamlined flows of film-forming material before their extrusion. As shown in FIG. 3, the film areas 27 appear as pronounced grooves or score lines, which are, of course, weaker than any other areas of the film and thus facilitate easy separation of the film into tapes or ribbons.

As heretofore mentioned, the film 25 is preferably oriented by being stretched in a longitudinal direction in any conventional manner to improve its tensile properties and to enhance its fracturability into individual tapes and ribbons.

It is to be understood that changes and variations may be made without departing from the spirit and scope of the invention as defined in the appended claims.

I claim:

1. Method of making longitudinally pre-patterned films including the steps of delivering under pressure a continuous, unbroken stream of flowable film-forming material of generally uniform thickness which is unconfined in only its direction of flow, obstructing the thus confined stream of film-forming material in a direction generally perpendicular to its direction of flow at areas which are spaced from each other in a direction transverse to the direction of stream flow to thereby divide the same into a series of separate streamlined flows of film-forming material, permitting successive portions of adjacent of such streamlined flows of film-forming material to contact and only partially blend with each other concomitantly with their continuous travel to provide an unbroken stream of film-forming material having continuous, substantially parallel areas extending longitudinally thereof which are of reduced thickness, releasing the stream formed by the contacting flows of film-forming material from confinement while the areas of reduced thickness remain therein, and setting such stream to provide a solid film.

2. A method as defined in claim 1 further including the step of stretching the solid film in its longitudinal direction to orient the molecules thereof.

References Cited

UNITED STATES PATENTS

| | | | |
|---|---|---|---|
| 2,402,281 | 6/1946 | Green | 264—177 |
| 2,581,614 | 1/1952 | Veit | 18—12 |
| 3,117,342 | 1/1964 | Koppehele | 264—177 |
| 3,333,039 | 7/1967 | Hureau | 264—146 |

ROBERT F. WHITE, Primary Examiner

J. R. THURLOW, Assistant Examiner

U.S. Cl. X.R.

18—12, 15; 264—146, 210